United States Patent [19]  [11] 3,985,554
McCoy [45] Oct. 12, 1976

[54] METHOD FOR REMOVING METALS FROM DILUTE AQUEOUS SOLUTIONS

[75] Inventor: Frederic C. McCoy, Beacon, N.Y.

[73] Assignee: Texaco Inc., New York, N.Y.

[22] Filed: Mar. 27, 1975

[21] Appl. No.: 562,997

Related U.S. Application Data

[63] Continuation-in-part of Ser. No. 418,146, Nov. 21, 1973, abandoned.

[52] U.S. Cl. .................................. 75/109; 75/117; 75/118 R; 75/120; 75/121
[51] Int. Cl.² ............... C22B 11/04; C22B 13/04; C22B 15/12; C22B 25/04
[58] Field of Search ............ 75/109, 117, 118, 120, 75/121

[56] References Cited
UNITED STATES PATENTS

| 2,829,170 | 4/1958 | Moore | 75/109 X |
|---|---|---|---|
| 2,905,323 | 9/1959 | Megesi | 75/109 X |
| 3,039,865 | 6/1962 | Gilbert et al. | 75/81 |
| 3,674,466 | 7/1972 | Anderson et al. | 75/109 |
| 3,900,314 | 8/1975 | Hulsebos | 75/117 X |
| 3,902,896 | 9/1975 | Borbely et al. | 75/118 X |

OTHER PUBLICATIONS

*Condensed Chemical Dictionary*, 6th Edn., Reinhold Publishing Corp., N.Y., 1961, p. 952.

*Primary Examiner*—G. Ozaki
*Attorney, Agent, or Firm*—T. H. Whaley; C. G. Ries; Henry W. Archer

[57] ABSTRACT

Disclosed is a method for recovering from dilute aqueous solutions metals below iron in the electromotive series by percolating the solutions through iron particles having a size such as will pass completely through a 100 mesh sieve, or by intimately mixing the solutions and the iron particles, followed by filtration or centrifuging. The iron particles are "swarf" produced by the grinding of ferrous metals.

4 Claims, No Drawings

METHOD FOR REMOVING METALS FROM DILUTE AQUEOUS SOLUTIONS

This application is a continuation-in-part of abandoned application Ser. No. 418,146 filed Nov. 21, 1973.

FIELD OF THE INVENTION

This invention is concerned with a method for effectively and inexpensively removing from dilute aqueous solutions metals located below iron in the electromotive series.

The prior art to which this invention relates is already aware, inter alia, of the following U.S. Pat. Nos. 684,578; 3,039,865; 3,697,567 and 3,674,466. The first of these describes a precipitant for recovering previous metals from cyanide solutions and consisting of zinc and a gritty inert non-metallic material, the size of the zinc particles not being too fine to avoid wasting of cyanide solutions. U.S. Pat. No. 3,039,865 describes the use of zinc shavings to recover mercury from cell brine. U.S. Pat. No. 3,697,567 describes a process for removing lead by the use of metals more electropositive than lead; the form of the metal being such that it has a high surface to volume ratio such as chopped sheet, foil, shavings, wire or powder. U.S. Pat. No. 3,674,466 suggest the use of metal turnings, millings, chips, shaving and the like to remove copper from solutions by having the copper plate out on the metal. Typically the particle size of the materials described in the above discussed patents would be such as to be retained on screens between about 4 mesh and 10 mesh. The diameter of a 10 mesh particle is about 1700 microns and that of a 4 mesh particle is over 2000 microns.

SUMMARY OF THE INVENTION

In accordance with the present invention, it has been found that the adsorptive capacity of iron for various metals below it in the electromotive series can be increased to an unexpected extent by providing such iron in an extremely fine state in which state it is usually inexpensively available. The particle size of the iron is less than 150 microns and preferably between 75 and 150 microns (200–100 mesh) or about 10 times less than the size described in the prior art. Optionally, to make the swarf more readily flowable it can be mixed with up to 10 percent by weight of microfine calcium-aluminum silicate.

The object of the present invention is to provide a method for substantially and inexpensively reducing the concentrations of gold, mercury, copper, tin and other metals below iron in the electromotive series from dilute aqueous solutions containing these metals.

The method of the invention whereby the foregoing object is attained comprises passing a solution containing one or more of the above mentioned metals in the form of uncomplexed ions over a bed of iron powder and maintaining contact therebetween until the desired reduction in concentration of the metal or metals is obtained.

The iron powder used is deoiled swarf from ferrous metal grinding operations.

The swarf used in this invention is generated in large quantities wherever steel, cast iron, wrought iron or other ferrous metals are subjected to grinding operations. It is removed from grinding machines as a pastry sludge containing finely divided metal, grinding oil, oxidized resinous material and a small amount of abrasive material from the grinding wheel and discarded. In order to prepare it for use in this method the swarf must be freed of oil and other oleophilic organic matter. This can be accomplished, for example, by a combination of centrifugation and extraction with suitable solvents. The latter include lower boiling aliphatic and aromatic hydrocarbons, acetone, methyl ethyl ketone, isopropanol, halogenated hydrocarbons and the like. A preferred treatment involves extraction with mixed pentanes followed by extraction with acetone and subsequent removal of residual solvents.

In a preferred embodiment of the invention, the removal of dissolved metals which are well below iron in the electromotive series (Sn, Pb, Cu, Hg, Ag, Rh, Pd, Pt, Au) is accomplished by percolating an aqueous solution thereof through a column of deoiled swarf, preferably at temperatures in the range of 20°–50° C. When the capacity of a given column is exceeded, the associated heavy metal can be recovered by whatever chemical means is appropriate for the metal involved. For example, in the case of Hg it may be sufficient just to heat the column to the point where Hg vaporizes.

In cases where the deposited metal is soluble in acids, the contents of the column can be removed and digested with a suitable acid, or they can be reacted with acid without removal from the column. The solution of water-soluble salts may be treated further, for example, by electrolysis or chemical precipitation, to recover the desired metal. The contents of the column can also be contacted with mercury in a stirred vessel to recover metals which form amalgams. Other procedures well known in the art of metallurgy may be used to recover the deposited metals.

Instead of percolation, the solution from which it is desired to remove heavy metals can be intimately contacted with swarf in a stirred vessel followed by settlement, filtration or centrifugation.

Regardless of the method used for recovery of deposited metals, the treated swarf may be used for further metal recovery if desired, to the extent that it contains metallic iron. Alternatively, the spent swarf may be discarded without recovering the deposited metal or metals.

In the area of environmental protection, this process is useful for removing small amounts of water-soluble Sn, Pb, Cu, or Hg compounds from plant effluents. It should be noted that for every atom of metal removed from the water, an atom of soluble Fe is released into the column effluent. However, iron is usually less objectionable that the metal which replaces it. This is particularly true of mercury.

In the case of the noble metals, the process is used to advantage to recover metals values which would otherwise be lost.

The following table illustrates the percolation process using solutions of Cu, Au, Hg, Ni and Sn. It will be noted that Ni was not efficiently removed compared to the other metals. This is probably due to the fact that the oxidation potential for $Ni \rightarrow Ni^{++}$ is +0.250 volts compared to +0.44 volts for $Fe \rightarrow Fe^{++}$. All of the other metals previously listed as operable in this process have considerably larger oxidation potential differences in relation to Fe than does Ni.

The glass column used in this work was 75 cm long and had an I.D. of 20 mm.

PERCOLATION OF AQUEOUS SOLUTION THROUGH DE-OILED SWARF

| Run No. L-771- | 3839 | 3842 | 3870 | 3908.1 | 3908.2 |
|---|---|---|---|---|---|
| Concentration of solution used | 200 ml. of a soln. of 1 g. $Hg(NO_3)_2 \cdot H_2O$ in 1000 ml. $H_2O$ | 200 ml. of a soln. of 0.6 g. $HAuCl_4 \cdot 3 H_2O$ in 300 ml. $H_2O$ | 1200 ml. of a soln. like L-771-3839 | 1200 cc. of a soln. of $CuSO_4 \cdot 5H_2O$ cont. about 0.1% Cu | 200 ml. of a soln. of $NiCl_2$ cont. about 0.1% Ni |
| Wt. of Swarf, g. | 12.5 | 12.5 | 12.5 | 12.5 | 12.5 |
| Metal in Orig. Soln. (Actual Analysis) | 1076 PPM Hg | 88 PPM Au | 763 PPM Hg | 960 PPM Cu | 1010 PPM Ni |
| Cut No. 1 | | | | | |
| Vol. cc. | 186 | 180 | 200 | 200 | 180 |
| Analysis | 2 PPM Hg; 146 PPM Fe | 1 PPM Au; 54 PPM Fe | 7 PPB Hg | 0.2 PPM Cu; 740 PPM Fe | 880 PPM Ni; 32 PPM Fe |
| Cut No. 2 | | | | | |
| Vol. cc. | — | — | 200 | — | — |
| Analysis | — | — | 4 PPB Hg | — | — |
| Cut No. 3 | | | | | |
| Vol. cc. | — | — | 200 | — | — |
| Analysis | — | — | 23 PPB Hg | — | — |
| Cut No. 4 | | | | | |
| Vol. cc. | — | — | 200 | 200 | — |
| Analysis | — | — | 10 PPB Hg | No Cu; 850 PPM Fe | — |
| Cut No. 5 | | | | | |
| Vol. cc. | — | — | 200 | — | — |
| Analysis | — | — | 8 PPB Hg | — | — |
| Cut No. 6 | | | | | |
| Vol. cc. | — | — | — | — | — |
| Analysis | — | — | 8 PPB Hg | — | — |

| Expt. No. L-771- | 3908.3 | 3908.1 |
|---|---|---|
| Solution Used | 200 ml. of a soln. of $SnCl_2$ cont. about 0.1% Sn | 1200 cc. of a soln. of $CuSO_4 \cdot 5H_2O$ cont. about 0.1% Cu |
| Wt. of Swarf, g. | 12.5 | 12.5 |
| Metal in orig. Soln. (Actual Analysis) | 880 PPM Sn | 960 PPM Cu |
| Cut No. 1 | | |
| Vol. cc. | 200 | 200 |
| Analysis | 37 PPM Sn; 360 PPM Fe | 0.2 PPM Cu; 740 PPM Fe |
| Cut No. 2 | | |
| Vol. cc. | — | — |
| Analysis | — | — |
| Cut No. 3 | | |
| Vol. cc. | — | — |
| Analysis | — | — |
| Cut No. 4 | | |
| Vol. cc. | — | 200 |
| Analysis | — | No Cu; 850 PPM Fe |
| Cut No. 5 | | |
| Vol. cc. | — | — |
| Analysis | — | — |
| Cut No. 6 | | |
| Vol. cc. | — | 200 |
| Analysis | — | No Cu; 870 PPM Fe |

The following experiments were performed to determine the approximate capacity of swarf for removal of Cu and Hg from aqueous solution.

To the previously described column were charged 10g of an intimate mixture of 9.5 swarf and 0.5 g. of Micro-Cel T-13 (a microfine Ca-Al silicate used to make the swarf more readily flowable). An aqueous solution of $CuSO_4$ containing 0.4% Cu was percolated through the column and the effluent was examined for Cu content by neutron activation analytical procedures. Less than 1 ppm Cu was observed after 2000 ml effluent had been collected and only 3.6 ppm after 2200 ml effluent. This was equivalent to the removal of 8.4 g. Cu by 9.5 g. swarf, or 0.88 g. Cu per gram of swarf.

In another experiment an aqueous solution containing 1.0% Hg as $HgCl_2$ was percolated through a bed of 9.5 g. swarf mixed with 0.5 g. MicroCel T-13 with periodic examination by neutron activation for Hg. After 660 ml of effluent had been collected, no Hg was detected. However, the bed had congealed to the point that percolation could not be maintained. At this point the weight of Hg removed from solution was 6.6 g. Thus, the capacity of the swarf for Hg removal was at least 0.69 Hg per gram of swarf.

The following experiment illustrates the removal of Hg from solution by intimately mixing swarf and aqueous solution in a stirred vessel:

200 ml. of an aqueous solution containing 1% Hg as $HgCl_2$ were stirred for about 5 hours at 30°–40° C. with 1g. of a mixture of 95% swarf + 5% Micro-Cel T-13. When the mixture was filtered, globules of Hg were observed in the filter. Analysis of the filtrate showed 3 ppm. Hg. Thus, in this experiment, 0.95 g. swarf removed approximately 2.0 g. Hg. from solution.

It is to be understood that the foregoing specific examples are presented by way of illustration and explanation only and that the invention is not limited by the details of such examples.

The foregoing is believed to so disclose the present invention that those skilled in the act to which it appertains can, by applying thereto current knowledge, readily modify it for various applications. Therefore, such modifications are intended to fall within the range of equivalence of the appended claims.

What is claimed is:

1. A method for removing from dilute aqueous solution metals contained therein in the form of uncomplexed ions, said metals being below iron in the electromotive series and including tin, lead, copper, mercury, silver, rhodium, palladium, platinum and gold, which method comprises passing said solution over an absorbent bed consisting of a major amount of iron particles having a particle size less than 150 microns and 5 to 10 percent by weight of a finely divided calcium - aluminum silicate, maintaining contact between said bed and said solution until the desired reduction in concentration of the metal or metals is obtained and then removing said metal or metals from said bed.

2. The method of claim 1, wherein said bed is in the form of a column.

3. The method of claim 2, wherein said solution is percolated through said column at temperatures ranging from about 20° to about 50° C.

4. The method according to claim 1, wherein said swarf is first deoiled by extraction with mixed pentanes followed by extraction with acetone and removal of any residual solvents.

* * * * *